(12) United States Patent
Mosli (10) Patent No.: US 10,412,786 B2
(45) Date of Patent: Sep. 10, 2019

(54) DEVICE FOR MELTING ADHESIVE (71) Applicant: Robatech AG, Muri (CH)

(72) Inventor: Urs Mosli, Winterthur (CH)

(73) Assignee: ROBATECH AG, Muri (CH)

( * ) Notice: Subject to any disclaimer, the term of this patent is extended or adjusted under 35 U.S.C. 154(b) by 395 days.

(21) Appl. No.: 15/463,112

(22) Filed: Mar. 20, 2017

(65) Prior Publication Data
US 2017/0290100 A1  Oct. 5, 2017

(30) Foreign Application Priority Data

Apr. 1, 2016 (EP) ..................................... 16163514

(51) Int. Cl.
| H05B 3/64 | (2006.01) |
| B05C 11/10 | (2006.01) |
| B29B 13/02 | (2006.01) |

(52) U.S. Cl.
CPC ............ *H05B 3/64* (2013.01); *B05C 11/1042* (2013.01); *B29B 13/022* (2013.01)

(58) Field of Classification Search
CPC ..... H05B 3/84; B05C 11/1042; B29B 13/022; B29K 2105/0097; B29K 2075/00; F28F 1/26

See application file for complete search history.

(56) References Cited

U.S. PATENT DOCUMENTS

| 6,093,912 A | 7/2000 | Potchen |
| 6,175,101 B1 | 1/2001 | Miller et al. |
| 2004/0200858 A1 | 10/2004 | Kappeler et al. |

FOREIGN PATENT DOCUMENTS

| EP | 1115542 B1 | 11/2002 |
| EP | 1447143 A2 | 8/2004 |
| EP | 2650095 A1 | 10/2013 |
| FR | 2622602 A1 | 5/1989 |

OTHER PUBLICATIONS

European Patent Office, European Search Report, dated Sep. 13, 2016 (dated Sep. 13, 2016), 5 pages, Munich, Germany (citing only "A" references of general interest to the art).

*Primary Examiner* — Shawntina T Fuqua
(74) *Attorney, Agent, or Firm* — Christopher C. Dremann, P.C.; Christopher C. Dremann (57) ABSTRACT

A device for melting adhesive having a melting grill that has a multiplicity of passage openings, and heating elements, wherein the melting grill is heatable by the heating elements and melted adhesive heated by the hot melting grill is dischargeable through the passage openings, the melting grill on that side thereof that faces the adhesive to be melted having ribs. The melting grill has rotatable rods that are disposed beside one another and ribs that are disposed on the rods, the rods and the ribs being heatable by the heating elements, wherein ribs of adjacent rods are aligned so as to be directed toward one another, and the passage cross sections of the passage openings between the rods are modifiable by rotating rods of the melting grill. The device enables varied forms of delivery of solid adhesive to be melted at a high specific melting rate without the adhesive thereby being subjected to damage due to excessive thermal stress.

17 Claims, 4 Drawing Sheets

DEVICE FOR MELTING ADHESIVE

CROSS-REFERENCE TO RELATED APPLICATION

This United States non-provisional utility patent application claims the benefit of priority of European Patent Application No. 16 163 514.9 filed on Apr. 1, 2016, the entire disclosure of which is incorporated herein by reference.

FIELD OF THE INVENTION

The invention relates to a device for melting adhesive, having a melting grill that has a multiplicity of passage openings, and having heating elements, wherein the melting grill is heatable by means of the heating elements and melted adhesive by means of the hot melting grill is dischargeable through the passage openings, the melting grill on that side thereof that faces the adhesive to be melted having ribs.

BACKGROUND AND RELATED ART

Hot melt adhesives are employed in the most varied industries in order for parts to be interconnected. Simple manual apparatuses or automated application systems are available for preparing and supplying adhesive to the most varied substrates.

Automated application systems are very often employed in the manufacturing processes of products. The application systems are in most instances adapted to the respective manufacturing process of products and are composed of apparatuses and machine parts which are suitable for the process. Standard apparatuses are used in order for the variants of embodiments of apparatuses to be minimized, said standard apparatuses in combination with specific adhesive applicator heads or adhesive application equipment then forming a system that is optimized for the process.

For example, an adhesive application apparatus which includes the following functions is used: The adhesive to be melted is placed in a pre-melting tank, or is supplied by way of an automatic supply system, such as a granules conveyor, for example. The still solid adhesive is heated and, on account thereof, liquefied in the pre-melting tank. The liquid adhesive makes its way into an adjoining reservoir region that belongs to the pre-melting tank. A conveying pump conveys the liquid adhesive from the reservoir region by way of a hose to one or a plurality of adhesive applicator heads. Switchable valves by way of which the application of adhesive can be switched on or off on account of control signals are attached in the applicator heads. An adhesive melting apparatus is employed if a roller application system is to be employed instead of the applicator heads. By contrast to the adhesive application apparatus, the liquid adhesive is not supplied to the adhesive applicator heads but is conveyed into a reservoir tank in which rollers rotate. A fill level sensor which checks the fill level of adhesive is attached in the reservoir tank. If adhesive is required, the fill level sensor signals this requirement to the controller of the adhesive melting apparatus, and the apparatus conveys liquid adhesive into the reservoir tank until the fill lever sensor signals that there is no longer any requirement.

The adhesive in the adhesive application apparatus and in the adhesive melting apparatus is converted from the solid state to the liquid state by the influence of heat. Depending on the adhesive, the latter in the non-heated solid state has various forms of delivery. The forms of delivery can be granules, pellets, or small blocks. Candles having a weight of 2, 3, or 20 kilograms are also employed.

A device for providing a free-flowing medium in a controlled manner is described in EP 1 447 143 A2. Said device comprises a container for receiving adhesive, and a melting device for causing an increase in temperature. The melting device has an exit region having at least one passage for the free-flowing adhesive. If and when the melting device is heated the adhesive that is in direct contact with the melting device melts and makes its way through the at least one passage into the following storage unit. It has been demonstrated in practice that the melting device has to be provided with a plurality of passages in order for the liquid adhesive to be able to positively flow out, and that the passages have to have a diameter which is larger than the grain diameter of the granules. On account thereof, the device is unsuitable for melting adhesive in the form of granules. The granule bodies in a non-melted state can make their way through the passages into a storage unit, and the contact area between the melting device and the granules is small. This leads to a low melting rate. A press having a follow-up plate is provided for adhesive blocks or adhesive candles, in order for the melting rate to be increased. The use of the press having the follow-up plate requires an additional effort and renders the entire device expensive.

A hot melt glue melting device having a melting grill with a multiplicity of passage openings for melting hot melt glue is proposed in EP 2 650 095 A1. The passage openings have an opening width that corresponds to 0.3 to 0.8 times the dimension of the smallest granule particles. The device is conceived for melting hot melt glue which is delivered in the form of granules. The arrangement of a first heating installation in the external region of the melting grill restricts the choice of the overall dimensions of the melting grill. The heat has to be introduced into the melting grill by thermal conduction. The use of a second heating installation in the center of the melting grill demonstrates that the heat output is limited and only a relatively small melting grill area is available for melting the adhesive. This may suffice for the envisaged application of gluing filter paper in products of the tobacco-processing industry. The area of the proposed melting grill is insufficient for adhesive melting apparatuses or adhesive application apparatuses which have to melt adhesive in small as well as large amounts.

Furthermore, melting of adhesive in the form of blocks or candles is implementable only under certain conditions. The available surface that can contact the adhesive is too small.

A device of the type mentioned at the outset is known from EP 1 115 542 B1. The hot melt glue melting device described therein has a melting grill which has a plurality of downwardly extending elongate grill elements in the form of ribs which are thermally connected to a heating element. A reservoir container has a plurality of upwardly extending thermal transfer elements that are configured as ribs and are connected to a heating element. The elongate grill elements herein engage in the upwardly extending thermal transfer elements. Furthermore, the downwardly extending grill elements have further ribs. A first and a second set of ribs point upward and are mutually orthogonal. Said first and second set of ribs herein form a grill structure having openings through which the liquid adhesive can flow into the reservoir container. The first and the second set of ribs herein have dissimilar heights such that solid adhesive in the form of pellets, blocks, or candles, does not simultaneously touch both rib ends when said adhesive comes to lie on the ribs. On account thereof, the higher heated ribs intrude into the solid adhesive at a faster rate, on account thereof enabling a high melting rate also in the case of these forms of delivery of adhesive. The elongate grill elements by way of a third set of ribs engage in the thermal transfer elements. Such a melting grill is very complex in manufacturing. High apparatus costs arise on account thereof. This represents a major disadvantage of the device. On the other hand, the shape of the melting grill is not modifiable if and when the latter is installed in a hot melt glue melting device. The melting grill is modified for melting adhesive in the form of granules or pellets, and in the form of blocks or candles, when a high melting rate is to be achieved. A high melting rate thus cannot be achieved for all forms of delivery of the adhesive by way of the hot melt glue melting device.

OBJECTS AND SUMMARY OF THE INVENTION

It is an object of the present invention to refine a device of the type mentioned at the outset such that said device eliminates the disadvantages of the existing devices as has been discussed above. The device is intended to enable in particular the most varied forms of delivery of solid adhesive to be melted at a high specific melting rate without the adhesive thereby being subjected to damage due to excessive thermal stress.

The object is achieved by a device which is configured according to the features of the exemplary embodiments disclosed herein. In the case of the device for melting adhesive it is thus provided that said device has a melting grill having a multiplicity of passage openings, and heating elements. The melting grill is heatable by means of the heating elements. Adhesive that has been melted by means of the hot melting grill is dischargeable through the passage openings. The melting grill on that side thereof that faces the adhesive to be melted has ribs. It is of particular significance that the melting grill has rods that are disposed beside one another and ribs that are disposed on the rods. The rods and the ribs are heatable by means of the heating element. The ribs of adjacent rods are aligned so as to be directed toward one another. The passage cross sections of the passage openings between the rods are modifiable by rotating rods of the melting grill.

The cross-sectional modification of the passage openings is preferably established in that all rods are rotatable and are rotated. However, in terms of two rods that are each disposed in a mutually adjacent manner it is sufficient in principle for only one of the rods to be rotated in order for the passage cross section between these rods to be modified.

The device thus has modifiable passage cross sections of the melting grill, on account of which it is possible for the melting grill and the thermal transfer thereof to be adapted in a simple manner to the various forms of delivery of the adhesive.

The modification of the passage cross section is performed in particular exclusively by modifying the position of the ribs which are connected to the various rods. The cross section of the respective rod herein is rotationally symmetrical such that the rotation of the rod does not have any influence on the passage cross section. However, it would be readily possible for the cross section of the rod not to be designed so as to be rotationally symmetrical such that the rotation of the rod conjointly contributes toward the modification of the passage cross section of the passage openings.

The arrangement of the respective rod and the rib assigned thereto in terms of construction is of particularly simple design and is manufacturable in a cost-effective manner when the respective rod and the ribs that are disposed on this rod are integral. This component is in particular a casting from metal.

According to one exemplary embodiment it is provided that the rotation axes of the rods are disposed so as to be mutually parallel. On account thereof, a melting grill of simple design and simple functionality that is homogenously subdivided can be formed. In particular, the rods are mutually disposed such that the rotation axes have identical spacings.

It is likewise considered particularly advantageous in terms of the aspect of optimal constructive properties and of cost-effective manufacturing for the ribs of the respective rod to extend perpendicularly to the rotation axis of this rod. This arrangement of the ribs in relation to the assigned rod enables the passage cross sections of the passage openings to be modified in a defined manner by way of the simplest manner.

It is provided in particular that the ribs of the respective rod encircle the rod. On account thereof, guiding of the melted adhesive is possible by means of the ribs, independently of the respective rotary position of the rod, and the ribs in a part-region moreover always face the adhesive to be melted, independently of the rotary position of the rod.

The respective rib is preferably designed in such a manner that the former in a first direction has a first spacing from the rotation axis of the assigned rod, and in a second direction that is perpendicular to the first direction has a larger second spacing from the rotation axis of this rod. Thus, a design in which the respective rib has four rib segments of which two first rib segments that are disposed in a mutually opposed manner each have larger radial extents in relation to the assigned rod than two second rib segments that are likewise disposed in a mutually opposed manner and are disposed so as to be perpendicular to the first rib segments is presentable. On the one hand, this design enables the passage cross section of the passage openings between the rods to be modified in a simple manner, and on the other hand the contact level of the ribs on the adhesive to be melted to be modified in relation to the vertical. This has an influence on the melting and throughput rate of the adhesive.

The respective rib preferably has a plurality of rib ends, in particular four rib ends, that are curved in a radially outward manner. It is furthermore considered advantageous for the respective rib in a connection region to this assigned rod to have a maximum material thickness in the direction of the rotation axis of the rod, in particular to widen in a conical manner in the direction of the rod. The aforementioned design embodiments contribute toward optimizing the melting of the adhesive.

It is considered particularly advantageous for the ribs of adjacent rods to be disposed so as to be offset by half a rib spacing. On account thereof, it is possible for the rods to be disposed such that the long rib segments engage in one another, thus forming a definable passage between the ribs. The liquid adhesive can be discharged through this passage, in particular into a reservoir region of a pre-melting tank. The passage size defines the maximum permissible size of the solid particles of the adhesive that can pass through the melting grill. In order to achieve a high melting and throughput rate, adhesive which in the melted state has a very high viscosity requires a passage size that is different from that of an adhesive having a lower viscosity.

Depending on the level of automation and on the requirements, the rods are rotatable in a manual or mechanized manner. It is preferably provided that rods, in particular all rods, are rotatable in a coupled identical manner. The rotation of one rod about a defined angle thus leads to an identical rotation of the other rods.

The rods are preferably rotatable in such a manner that in a first terminal position of the respective rod the ribs of the latter in relation to the aforementioned second direction of the former are disposed so as to be horizontal, and in a second terminal position of this rod the ribs of the latter in relation to the aforementioned second direction of the former are disposed so as to be vertical. Relatively small passage cross sections of the passage openings between the rods thus result in the first terminal position, and relatively large passage cross sections of the passage openings between the rods thus result in the second terminal position.

The rods are preferably fixable in defined rotary positions. On account thereof it is prevented that the rods and thus the ribs are rotated out of the defined rotary positions, in particular under the influence of the weight of the adhesive to be melted.

In the case of the device for melting adhesive it is furthermore considered advantageous for said device to have a container having the melting grill disposed therein, wherein a passage opening between a lateral container wall and the arrangement of a rod and ribs that is adjacent to said lateral container wall is coverable by means of a cover, or for the lateral container wall to be provided with rods that are directed toward this rod. On account thereof, the passage between the outermost rod and the ribs thereof and the side wall is reduced.

In terms of the aspect of optimal heating of the melting grill and of a simple design it is considered advantageous for the rods to receive the heating elements and for the heating of the ribs to be performed by thermal conduction by way of the rods. It is furthermore considered advantageous for temperature probes that are connected to a controller and detect the temperatures of the rods to be provided, said temperature probes regulating the temperatures of the rods in a thermally optimal manner in order to avoid the adhesive to be overstressed in thermal terms.

In the case of the simplest configuration, the rods are disposed in a straight plane. Design embodiments that deviate therefrom are readily possible, in particular the arrangement of the rods in a kinked plane or in a curved plane. It is provided in particular that in the case of a kinked plane or of a curved plane, said plane is disposed so as to be centrally curved downward.

In terms of the aspect of the described device for melting adhesive, including the refinements discussed, it is thus considered particularly advantageous for the ribs of the one rod, in the case of a corresponding rotated position of the rods, to be in each case directed toward the ribs of the other rod and to mesh with the ribs of the respective adjacent rods in such a manner that a spacing and thus a passage opening which is formed from a multiplicity of sequentially disposed periodically repeated part-lengths to be formed between the ribs of the rods. The passage cross section of this passage opening is formed on account thereof. If the adjacent rods are relatively rotated in relation to one another from this initial position, this leads to the interacting ribs of the adjacent rods to overlap to a lesser extent, so as to correspond to the chosen rotary angle, on account of which the passage cross section is enlarged. A state in which the ribs of adjacent rods no longer engage in one another at all can be achieved by the relative rotation of the rods in relation to one another, on account of which a particularly large passage cross section of the passage opening is formed. The respective passage cross section of the passage opening that has to be chosen is adapted to the form of delivery and thus to the form of the non-heated solid adhesive, in particular to the form of delivery as granules, pellets, small blocks, or candles.

The configuration of the melting grill is a substantial advantage. The opening of the passage can be modified on account of the possibility of rotating rods together with the ribs. A small passage in the interaction of the ribs is advantageous for the forms of delivery of the adhesive in the form of pellets or granules. A larger passage is required for the forms of delivery in blocks or candles, in order for a high melting rate to be achieved.

The capability of modifying the passage on the melting grill enables adhesives which in the liquid state have a very high viscosity and adhesives which in the liquid state have a low viscosity to be processed at a high melting rate, without replacing the melting grill.

The ribs in relation to the solid adhesive are oriented in another manner by rotating the rods. On account thereof, the rib surface that has to melt down a solid body can act more rapidly, and the solid adhesive body is liquefied more rapidly than in the case of a rib arrangement that is optimal for pellets or granules.

The rods are heated by heating elements in the center of the rod, introducing the thermal energy into the adhesive by way of the ribs. A temperature probe detects the current temperature of the rods. The controller ensures that the temperature of the rod does not exceed the predefined value and does not excessively stress the adhesive. The temperature of the respective rod is chosen in a variable manner by the controller, depending on the consumption of adhesive, adhesive, the viscosity of the liquid adhesive, setting by the user, and on the operating status of the apparatus.

Further features of the invention are illustrated in the description of exemplary embodiments of the invention, in the description of the figures, and in the figures per se, wherein it is noted that all individual features and all combinations of individual features are relevant to the invention.

DESCRIPTION OF THE FIGURES

The invention is visualized in the figures by means of exemplary embodiments in a schematic illustration, wherein the invention is not limited to the exemplary embodiments.

DESCRIPTION OF EXEMPLARY
EMBODIMENTS OF THE INVENTION

Figure 1:
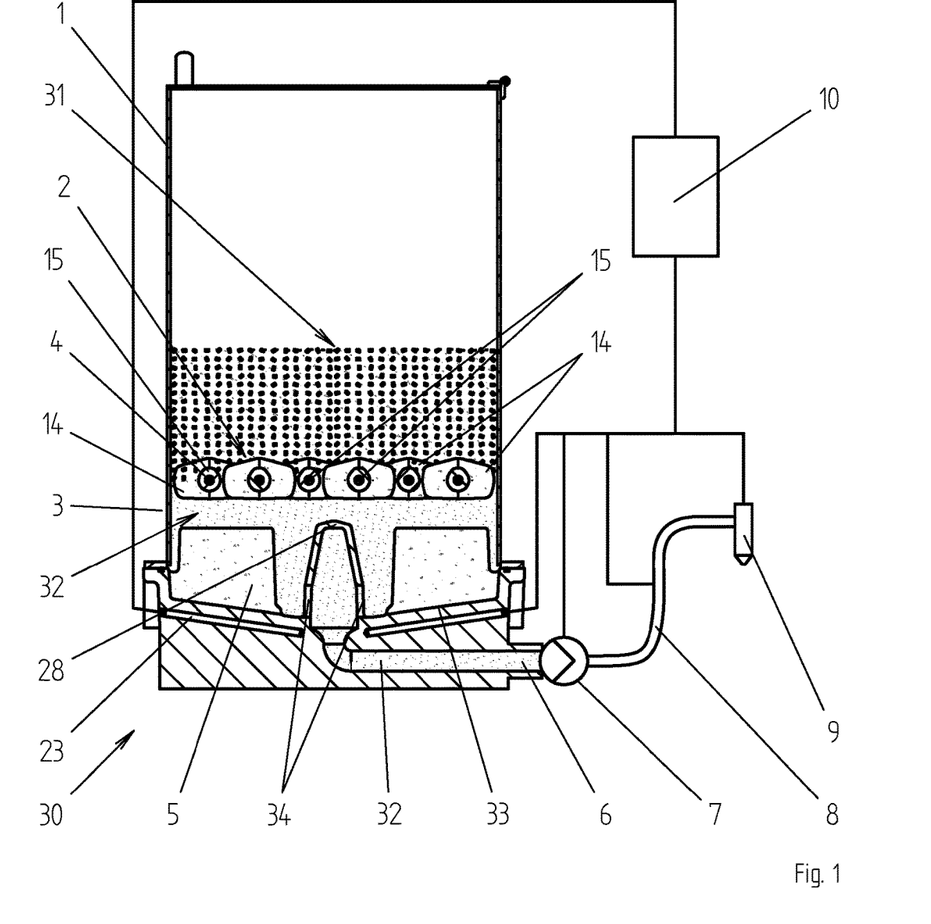
FIG. 1 shows an adhesive application apparatus which is provided with a melting grill, visualized in a vertical section, wherein the adhesive application apparatus is equipped with adhesive in the form of granules.

FIG. 1 shows the fundamental construction of a device 30 for melting adhesive, wherein this device is an adhesive application apparatus. The adhesive 31 to be processed, presently a granulate, for example an EVA granulate, is placed by hand into a pre-melting tank 1, or is supplied by an automatic supply system, such as a granules conveyor, for example. The still solid adhesive 31 is heated and, on account thereof, liquefied in the pre-melting tank 1. To this end, the pre-melting tank 1 has a melting grill 2 which can be heated by heating elements 4, thus heating the solid adhesive 31 from below and therefore liquefying the latter. The weight of the adhesive 31 pushes the latter against the melting grill 2, thus enabling constant contact with the ribs 14 of the melting grill 2. The liquid adhesive 32 and to some extent small non-melted adhesive particles make their way into an adjoining reservoir region 3 that belongs to the pre-melting tank 1. The reservoir region 3 is heated by heating elements 23 such that the liquid adhesive 32 can be brought up to and maintained at the temperature that is optimal for further processing. Ribs 5 which are thermally connected to the heating elements 23 are attached in the reservoir region 3 in order for the liquid adhesive 32 in the reservoir region 3 to be uniformly supplied with thermal energy. By way of these generous ribs 5 it is permissible for small adhesive particles that have not yet been fully melted to be able to be received in the uppermost part of the reservoir region 3. Said particles on the further way of the latter to a base 33 and to an outlet in the duct 6 of the device 30 will be completely melted and brought up to the envisaged processing temperature. It is important herein that the small non-melted adhesive particles form a single grain or grains. Adhesive particles from a plurality of grains which adhere to one another and simultaneously also enclose air have a poorer thermal transfer and must therefore not be supplied to the reservoir region 3.

A dome-type cover 28 is installed in the center, in order for the path to be sufficiently long also in the central part of the reservoir region 3 for the non-melted adhesive particles to be completely melted. Openings 34 through which the liquid adhesive 32 then can make its way to the outlet duct 6 are attached in the lower region of the cover 28.

The liquid adhesive 32 from the outlet duct 6 makes its way to at least one conveying pump 7. The at least one conveying pump 7 conveys the liquid adhesive from the reservoir region 3 by way of a heatable hose 8 to one or a plurality of applicator heads 9. Switchable valves by way of which the application of adhesive can be switched on or off on account of control signals are attached in the applicator heads 9.

These valves can be actuated by a controller 10 of the adhesive application apparatus or by a controller that belongs to the production machine. The apparatus is of modular construction in order for the adhesive conveying output of the adhesive application apparatus to be able to be adapted in an optimal manner to the adhesive requirement demanded by the machine. It is possible for a plurality of conveying pumps 7 to be employed in the case of each apparatus. A plurality of sizes of the pre-melting tank 1 are offered. The melting grill 2 that is required therefor can be readily adapted to the required size in that more or fewer elements are inserted.

The controller 10 is connected to the heating elements 4, 23 for the melting grill 2, and to the reservoir region 3, to the conveying pumps 7, the hoses 8, and the heating elements of the applicator heads 9. Said controller 10 regulates the predefined temperatures on the heating elements 4, 23 and controls the conveying pumps 7 so as to correspond to the adhesive requirement as demanded.

Figure 2:
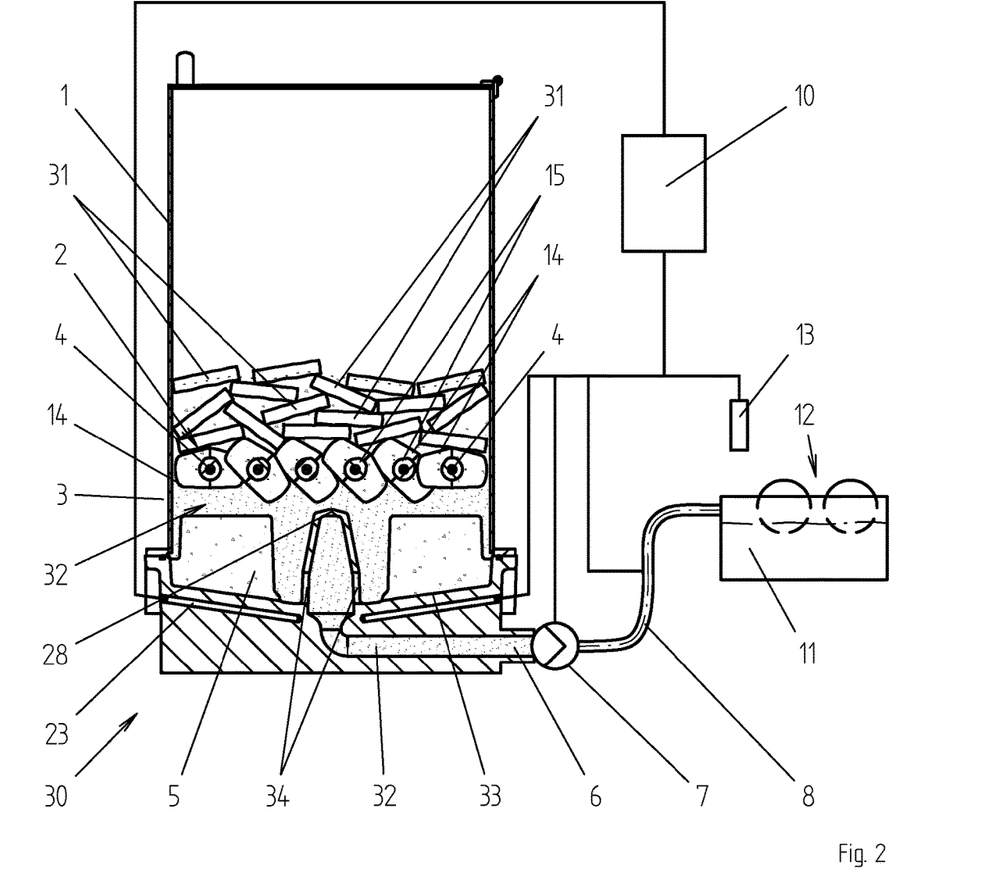
FIG. 2 shows an adhesive melting apparatus which is provided with a melting grill, visualized in a vertical section, wherein the adhesive melting apparatus is equipped with adhesive in block form.

FIG. 2 in an illustration that is comparable to that of FIG. 1 shows the construction of a device 30 which is configured as an adhesive melting apparatus. The apparatus is of a design that is fundamentally identical to that of the adhesive application apparatus, there being a point of differentiation only after the conveying pump 7. A description of the function in the identical region is thus dispensed with. No applicator heads 9 are served by the adhesive melting apparatus, but liquid adhesive 32 is conveyed into a reservoir tank 11. The latter is part of a roller application system 12 which is a component part of the production machine. The roller application systems 12 are adapted to the requirements of the production machine and typically have dissimilar embodiments for the various production processes.

A fill level sensor 13 which checks the fill level of liquid adhesive 32 is attached in the reservoir tank 11. If adhesive is required, the fill level sensor 13 signals the requirement of adhesive to the controller 10 of the adhesive melting apparatus, and the apparatus conveys liquid adhesive 32 into the reservoir tank 11 until the fill level sensor 13 signals that there is no longer any requirement. It is also possible in the case of this apparatus for a plurality of conveying pumps 7 and apparatus sizes to be used. A plurality of reservoir tanks can thus be filled in a mutually independent manner.

The design and the arrangement of the melting grill 2 is shown in FIGS. 3 to 6. The melting grill 2 is composed substantially of rods 15 that are provided with ribs 14, said rods 15 being disposed beside one another and thus forming a grill which supports the solid adhesive 31. The ribs 14, visualized by the extent of the line 16, in a first direction have a first spacing 17 from the rotation axis 35, and in a second direction that is orthogonal to the first direction, visualized by the extent of the line 36, have a second and substantially larger spacing 18 from the rotation axis 35. The dimension in the center of the rod 15, measured across the two rib ends of the first direction, herein is the largest dimension of the rib 14 in this direction. The respective rib 14 thus has four rib segments of which in each case two rib segments are identical, one segment pair being long and the other segment pair being comparatively shorter. The long rib segments are identified by the reference sign 37, the short rib segments being identified by the reference sign 38. The dimension in the center of the rod 15, measured across the two rib ends of the first direction, herein is the largest dimension of the rib 14 in this direction. This dimension in the first direction becomes smaller towards the rib end of the longer rib segments that are orthogonal thereto. The rib end of the respective long rib segment 37 terminates by way of a curved end 39. The respective rib 14 has the largest rib thickness 19 in the region of the rod 15. The thickness of the rib 14 toward the outer end thereof is reduced. As can be derived from FIG. 5, the rib thickness in the first direction is additionally conical and in relation to the illustrated orientation, in the case of a horizontal arrangement of the line 36, becomes thicker toward the bottom.

Figure 3:
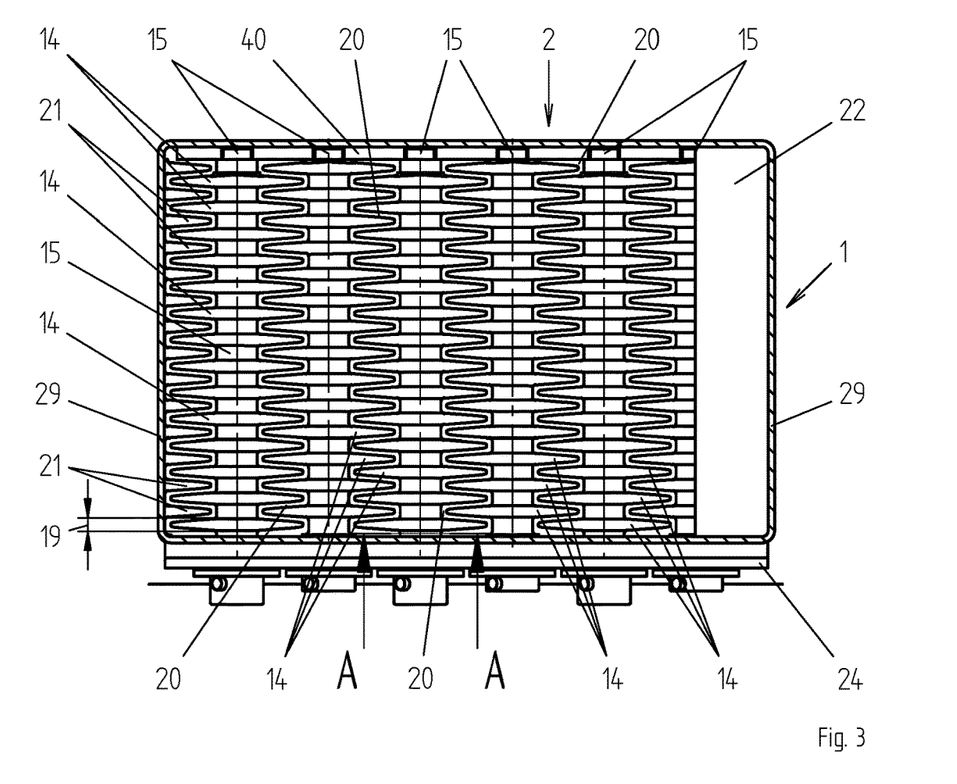
FIG. 3 shows the melting grill that is used in the apparatuses as per FIGS. 1 and 2, in a plan view seen from the feeding side.
Figure 4:
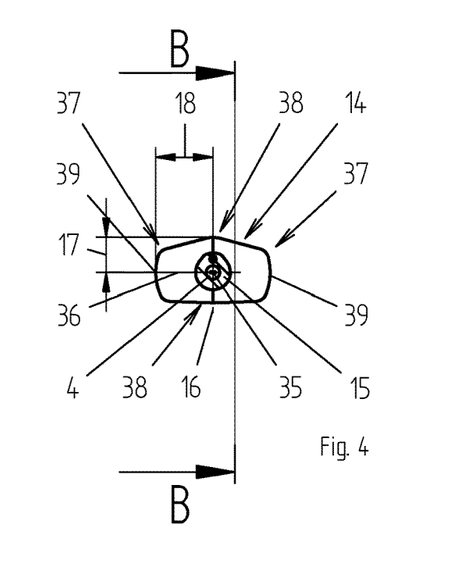
FIG. 4 shows a section A-A according to FIG. 3.
Figure 5:
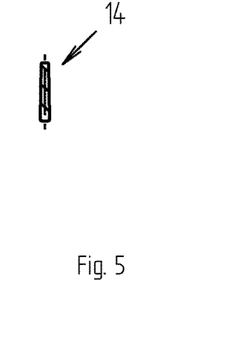
FIG. 5 shows a section B-B according to FIG. 4.

The respective rod 15 is provided with a plurality of such ribs 14, thus with a plurality of identical ribs 14. The latter in relation to the rod 15 are disposed in the same orientation. The ribs 14 and the rod 15 can be one component, in particular a casting from metal. The rotation axes 35 of the rods 15 are disposed so as to be mutually parallel and lie in a common plane. The spacing of adjacent rods 15 is identical. The ribs 14 of rods 15 that lie beside one another herein are offset by half a spacing, as can be derived in particular from the illustration of FIG. 3. On account thereof, it is possible for the rods 15 to be disposed such that, in the case of an orientation of the rods 15 according to the illustration in FIGS. 3 and 4, the long rib segments 37 engage in one another and thus form a definable passage opening 20 in the sense of a passage between the ribs 14. The liquid adhesive 32 can make its way into the reservoir region 3 of the pre-melting tank 1 through this passage opening 20 which in the plan view according to FIG. 3 presents itself as a gap having periodically repeated gap portions. The passage size defines the maximum permissible size of a solid particle of the adhesive that can pass through the melting grill 2. In order to achieve a high melting and throughput rate, an adhesive which in the melted state has a very high viscosity requires a passage size that is different to that of an adhesive having lower viscosity.

Figure 6:
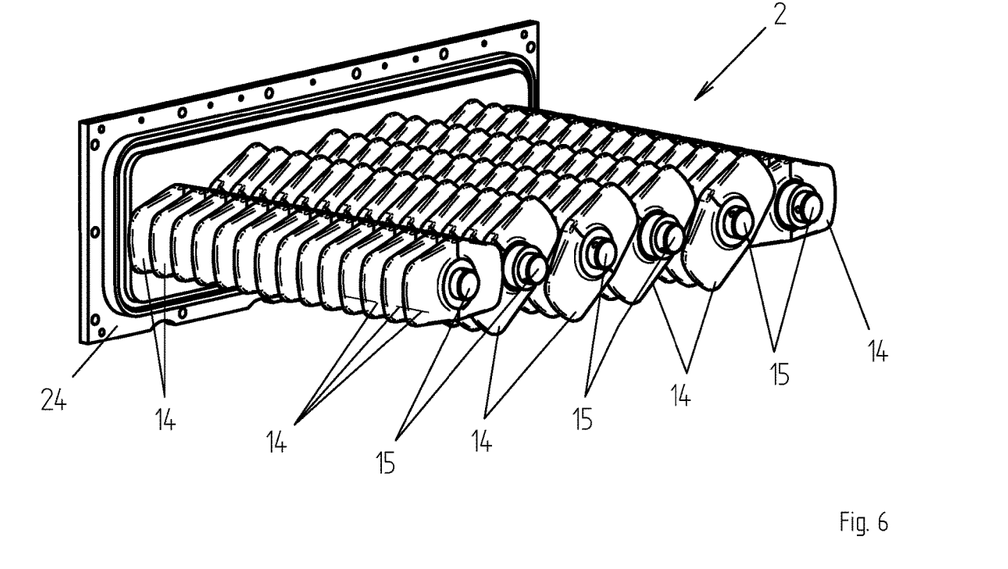
FIG. 6 shows a perspective view onto the melting grill, in conjunction with a side-wall lid of the apparatus that is capable of being dismantled.

The rods 15 are mounted on a side wall 40 of the pre-melting tank 1 and in a side-wall lid 24, capable of being dismantled, of the opposite side wall of the pre-melting tank 1. On account thereof, the rods 15 can be rotated and the passage cross sections of the passage openings 20 between the rods 15 and also the ribs 14 can thus be modified. By rotating the respective rod 15, contact between the ribs 14 and the solid adhesive 31 is furthermore modified. A rotation of the central rod 15 of about approximately 30° is shown in FIG. 6. On account thereof, the shape of the rib 14 that intrudes into the solid adhesive body 31 is modified when the latter is melted, in that the vertical distance from the center of the rods 15 up to the topmost point of the respective rib 14 is enlarged. This position of the ribs 14 is better suited for melting adhesive shapes of blocks or candles than the position in the horizontal state of the long rib segments 37, as is shown in FIGS. 3 and 4 and also for the two outer rods according to FIG. 6. The position of the rods 15 in the horizontal state of the long rib segments 37 is outstandingly suitable for melting granules or pellets.

The passage between the ribs 14 of the respective outermost rod 15 and the assigned side wall 29 is likewise reduced on the side wall 29 of the pre-melting tank 1, in a manner parallel to the rotation axes 35. Various constructions are suitable therefor. A simple sheet-metal cover 22 can be employed as a cost-effective embodiment, for example. It is somewhat more complex for ribs 21 to be attached to the side walls 29, which when additionally heated make the entire melting grill area utilizable.

Figure 7:
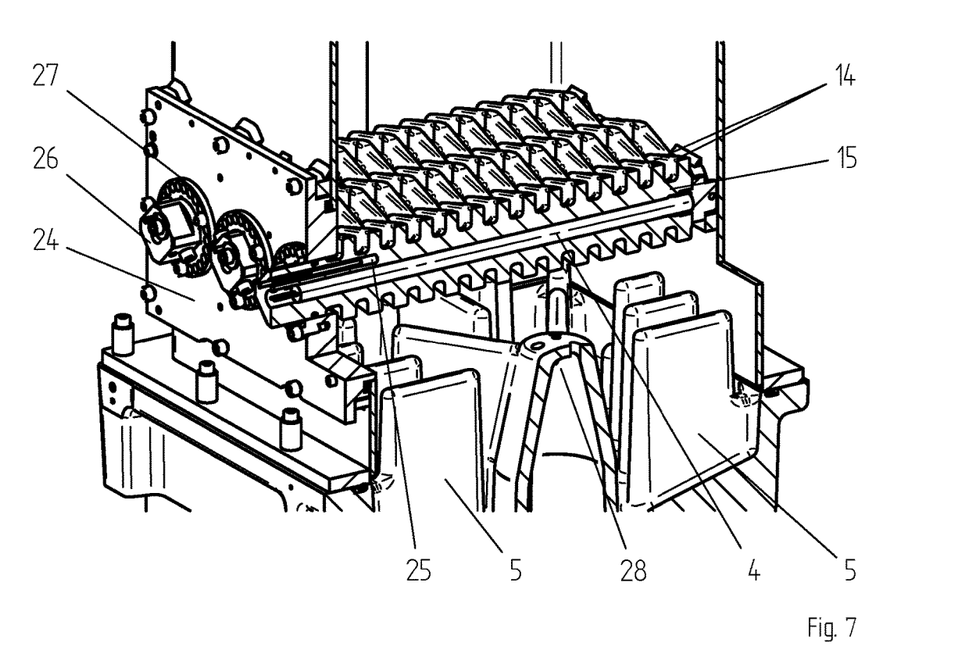
FIG. 7 shows a perspective view of a part-region of the apparatus, in a vertical section through the axis of one of the rods of the melting grill.

The rods 15 having the ribs 14 are heated by the heating element 4 in the center of the rod 15. A temperature probe 25 detects the temperature of the rod 15 and signals said temperature to the controller 10. The controller 10 ensures that the temperature of the rod 15 is regulated such that the adhesive that comes into contact with the ribs 14 of the rod 15 is never excessively heated and on account thereof damaged. The temperature of the rod 15 is chosen in a variable manner, depending on the consumption of adhesive, adhesive, the viscosity of the liquid adhesive, a setting by the user, and on the operating status of the apparatus.

In a first potential embodiment, the rods 15 on the side of the side-wall lid 24 that is capable of dismantling are provided with a square end 26. A flange 27 which is provided with a plurality of bores is plug-fitted over this square end 26. Of course, all other known possible connections between a shaft and a flange can also be employed here. The flange 27 is fastened with screws in relation to the side-wall lid 24, such that various angular positions can be chosen for the rods 15. The angular position of the rod 15 can be slightly modified by removing the screws and rotating the flange 27.

In one further potential embodiment the rotation of the angular position is automated. On account thereof, the flange could be configured as a gear wheel, for example. A gear rack which by a gear motor is displaced in the longitudinal direction and thus can cause a rotating movement of the gear wheels and thus of the rods is disposed above the gear wheels. On account thereof, the controller which knows items of information pertaining to the form of delivery of the adhesive and to the adhesive which is being processed can automatically perform the optimum setting of the angular position of the rods.

It is not mandatory for the melting grill 2 to be embodied in the type of a horizontal grill, as has been illustrated and described. Said melting grill 2 can readily be disposed in an inclined manner, or also be kinked or curved, in particular be kinked downward or curved downward in a central region. Embodiments having a plurality of melting grills on top of one another are also conceivable.

That which is claimed is:

1. A device for melting adhesive, comprising:
a melting grill having a multiplicity of passage openings, and having heating elements, wherein the melting grill is heatable by means of the heating elements and melted adhesive by means of the hot melting grill is dischargeable through the passage openings, the melting grill on that side thereof that faces the adhesive to be melted having ribs, wherein the melting grill has rods that are disposed beside one another and ribs that are disposed on the rods, the rods and the ribs being heatable by means of the heating elements, wherein ribs of adjacent rods are aligned so as to be directed toward one another, and the passage cross sections of the passage openings between the rods are modifiable by rotating the rods of the melting grill.

2. The device according to claim 1, wherein each of the rods and the ribs that are disposed on the respective rod are integral.

3. The device according to claim 1, wherein the rotation axes of the rods are disposed so as to be mutually parallel.

4. The device according to claim 3, wherein the ribs of each of the rods extend perpendicularly to the rotation axis of the respective rod.

5. The device according to claim 1, wherein the ribs of each of the rods encircle the respective rod.

6. The device according to claim 3, wherein each of the ribs is designed in such a manner that the rib in a first direction has a first spacing from the rotation axis of the assigned rod, and in a second direction that is perpendicular to the first direction the rib has a second spacing from the rotation axis of the respective rod that is larger than the first spacing.

7. The device according to claim 1, wherein each of the ribs has a plurality of rib ends that are curved in a radially outward manner.

8. The device according to claim 3, wherein each of the ribs (in a connection region to the respective rod has a maximum material thickness in the direction of the rotation axis of the rod that widens in a conical manner in the direction of the rod.

9. The device according to claim 1, wherein a first rib arrangement of a first rod and a second rib arrangement of a second rod that is adjacent to the first rod is of such a manner that the respective rib of the first rod engages in an intermediate space that is formed between two adjacent ribs of the second rod, and wherein the ribs of adjacent rods are disposed so as to be offset by half a rib spacing.

10. The device according to claim 1, wherein the rods of the melting grill are rotatable in a coupled identical manner.

11. The device according to claim 6, wherein the rods are rotatable in such a manner that in a first terminal position the ribs of each of the rods in relation to the second direction of the rib are disposed so as to be horizontal, and in a second terminal position of the respective rod the ribs of the respective rod in relation to the second direction of the rib are disposed so as to be vertical.

12. The device according to claim 1, wherein the rods are fixable in defined rotary positions.

13. The device according to claim 1, further comprising a container having the melting grill disposed therein, wherein a passage opening between a lateral container wall and the arrangement of a rod and ribs that is adjacent to said lateral container wall is coverable by a cover, and wherein the lateral container wall is provided with ribs that are directed toward the respective rod.

14. The device according to claim 1, wherein the rods receive the heating elements and the heating of the ribs is performed by thermal conduction by way of the rods, and wherein temperature probes are connected to a controller and detect the temperatures of the rods.

15. The device according to claim 1, wherein the rods are disposed in a straight plane.

16. The device according to claim 1, wherein the rods are disposed in a kinked plane that is centrally kinked downward.

17. The device according to claim 1, wherein the rods are disposed in a curved plane that is centrally curved downward.

* * * * *